Figure 5:
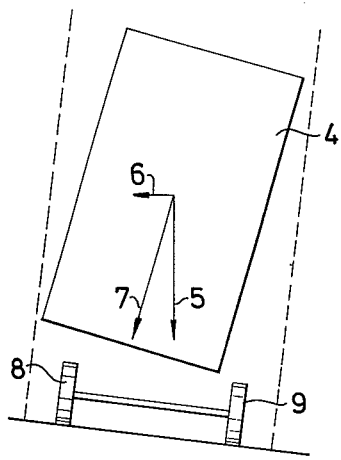

United States Patent [19]
Nordstrom

[11] 3,977,694
[45] Aug. 31, 1976

[54] ROLL STABILIZATION SYSTEM

[75] Inventor: Karl Tage Nordstrom, Vasteras, Sweden

[73] Assignee: Allmanna Svenska Elektriska Aktiebolaget, Vasteras, Sweden

[22] Filed: June 20, 1974

[21] Appl. No.: 481,380

[30] Foreign Application Priority Data
July 17, 1973 Sweden.............................. 7309973
Oct. 31, 1973 Sweden.............................. 7314809
June 4, 1974 Sweden............................. 7407283

[52] U.S. Cl............................ 280/112 A; 105/164; 105/171; 105/199 A; 105/201
[51] Int. Cl.²................. B60G 11/00; B60G 21/06; B61F 5/16; B61F 5/24
[58] Field of Search............ 105/164, 199 A, 199 R, 105/201, 210, 171; 280/112 A

[56] References Cited
UNITED STATES PATENTS

| | | | |
|---|---|---|---|
| 2,474,471 | 6/1949 | Dolan ................................ | 105/164 |
| 2,960,941 | 11/1960 | Li....................................... | 105/164 |
| 3,044,799 | 7/1962 | Fiala ............................... | 280/112 A |
| 3,089,710 | 5/1963 | Fiala ............................... | 280/112 A |
| 3,628,465 | 12/1971 | Dobson et al................... | 105/164 X |
| 3,631,810 | 1/1972 | Bing............................. | 105/199 R X |
| 3,717,104 | 2/1973 | Law............................. | 105/199 A X |

FOREIGN PATENTS OR APPLICATIONS

| | | | |
|---|---|---|---|
| 1,549,466 | 11/1968 | France............................. | 280/112 A |
| 2,129,716 | 12/1971 | Germany .......................... | 105/199 A |
| 2,201,255 | 8/1972 | Germany ........................ | 105/199 A |

Primary Examiner—Robert J. Spar
Assistant Examiner—Howard Beltran
Attorney, Agent, or Firm—Burns, Doane, Swecker & Mathis

[57] ABSTRACT

A vehicle has a wheeled chassis and a body movably mounted thereon, the body being able to carry goods and/or passengers. An accelerometer detects forces acting on the vehicle as the vehicle passes through a curve and is arranged to activate a vehicle body tilting and lateral displacing system. A first power mechanism tilts the body relative to the chassis toward the center of the curve. A second power mechanism laterally shifts the body relative to the chassis by applying lateral forces that are independent of the tilting forces. The lateral movement can be either toward or away from the center of the curve.

7 Claims, 13 Drawing Figures

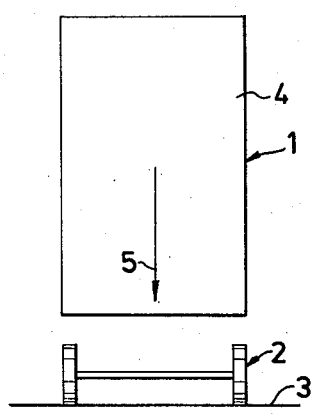
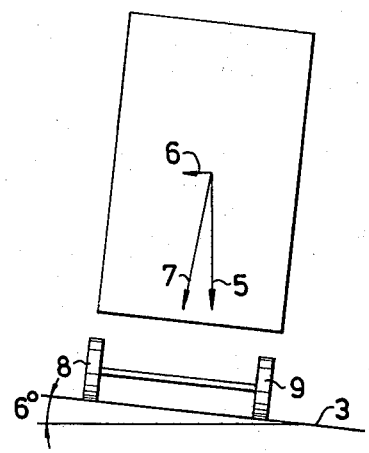
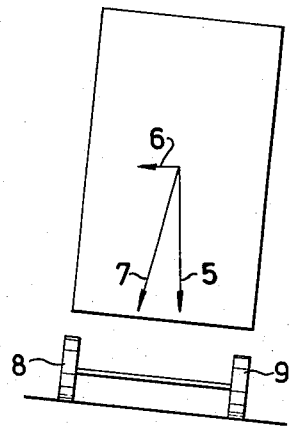
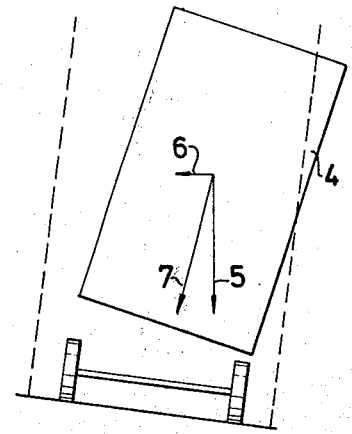

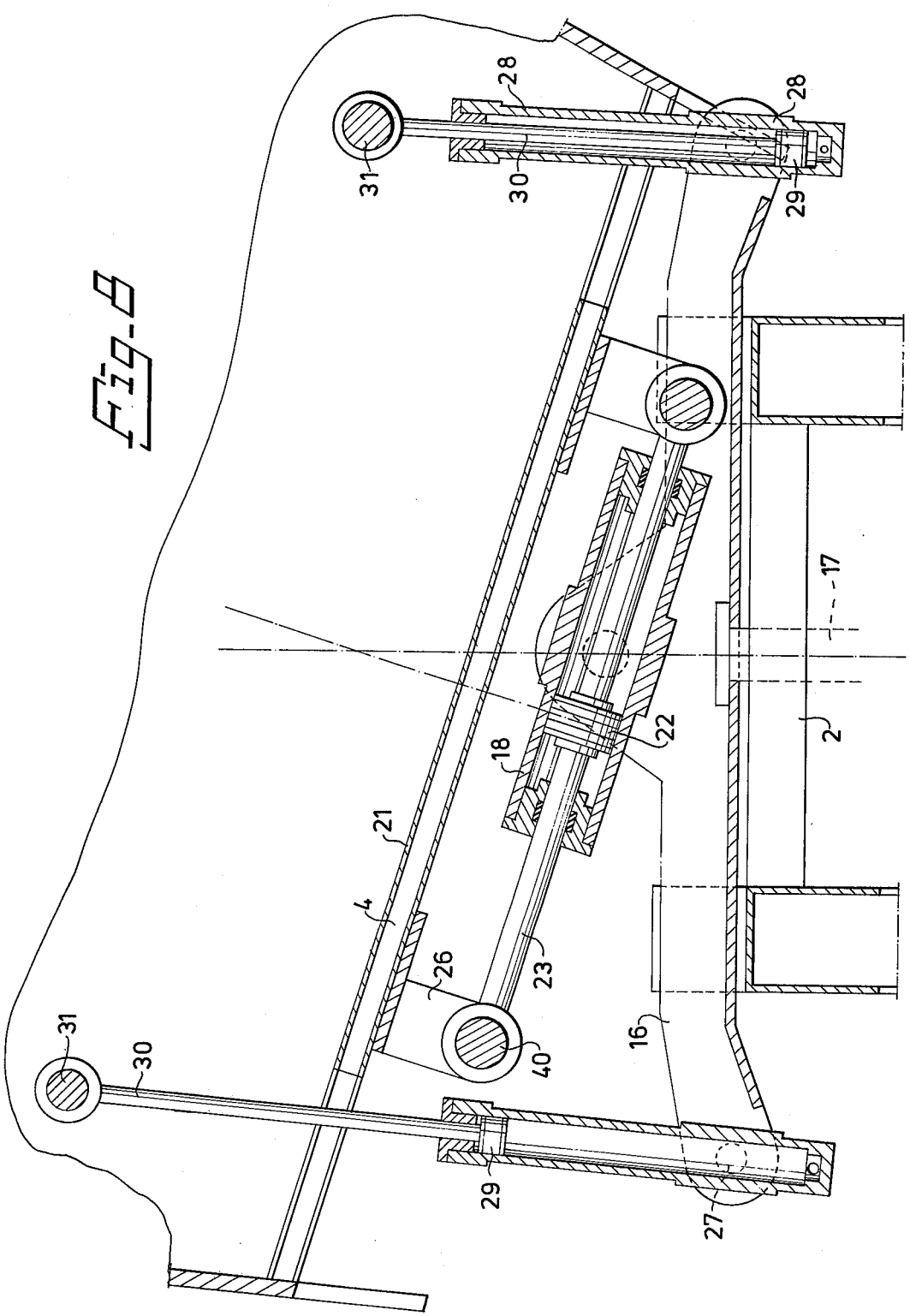

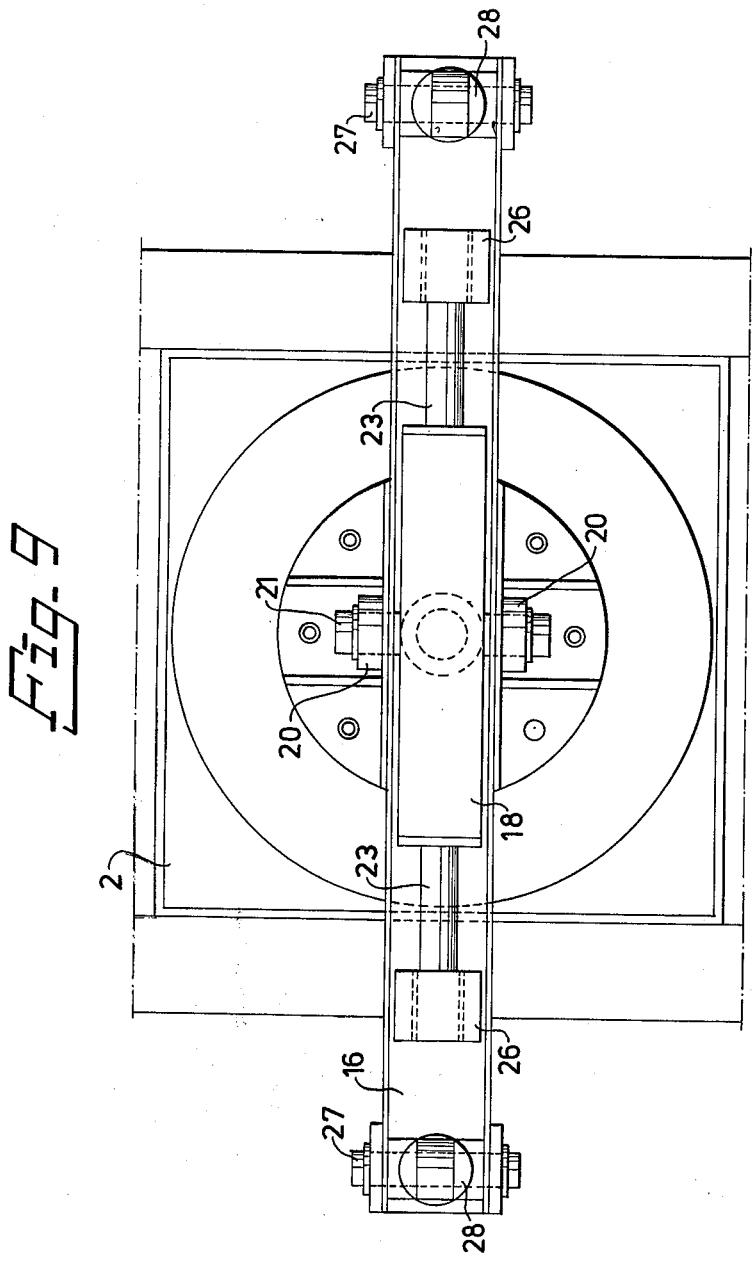

ROLL STABILIZATION SYSTEM

The present invention relates to vehicle stabilizing systems, and more particularly to vehicle stabilizing systems for counteracting the tendency of a vehicle to overturn outwardly and for reducing the outwardly acting forces acting on passengers and/or goods in the vehicle when said vehicle negotiates the curve. The vehicle referred to is of the type which comprises a wheel-supported chassis arranged to co-act with and being movable upon a supporting surface, a vehicle body movably mounted on said chassis and having supporting surfaces for passengers and/or goods, a force detecting device for detecting outwardly directed forces acting on said vehicle body and to generate control signals corresponding to said force, first operating means arranged between the vehicle body and the chassis for inclining the vehicle body in towards the centre of the curve, and second operating means for causing lateral displacement of the vehicle body in relation to the chassis.

The term "vehicle" as used here includes locomotives, railway cars, lorries and the like.

It is generally known that when vehicles of the aforementioned type negotiate a curve at high speed, the vehicle, passengers and/or goods are subjected to centrifugal forces directed from the centre of curvature of the curve, said forces, if the vehicle does not lean in towards the curve, tending to overturn the vehicle and subjecting the passengers to uncomfortable stresses.

Attempts have been made to solve this problem, and in, for example, the U.S. Pat. specification No. 3,717,104 there is described a system by means of which the vehicle body is inclined and laterally displaced. By means of the known system, the vehicle body is inclined and laterally displaced relative to the chassis, in towards the centre of the curve, the inclining and displacing movements being fully coupled to one another.

The most serious disadvantage with a system of this type, is that the vehicle body lies too far in towards the centre of the curve to be able to pass pylons or other obstacles located along the movement path of the vehicle, and the system cannot therefore be used on present day railways. If the main purpose of the system is to eliminate the risk of overturning and that, in consequence thereof, the fact that goods and/or passengers are subjected to outwardly acting forces can be accepted, the known proportional coupling between the inclining movement and the displacement movement in towards the curve will result in excessive angles of inclination, if stability is to be achieved.

An object of the invention is to provide a system with which the vehicle body is only modestly inclined, whilst the risk of overturning is substantially completely eliminated.

Another object of the invention is to provide a system which at least substantially eliminates the risk of overturning and with which the passengers and/or the goods are only subjected to forces acting perpendicularly or substantially perpendicularly to the passenger seating surfaces or to the goods supporting surfaces of the vehicle, and with which it is not necessary to increase the necessary free space on either side of a curved movement path, such as a curved railway tunnel for example, said free space being necessary to permit unimpeded movement of the vehicle at inclined attitudes thereof.

These objects are achieved by a system of the aforementioned type which is mainly characterized in that the second drive means are arranged to provide, independently of said first drive means, lateral displacement of the vehicle body relative to the chassis, and in that the resultant force, and its extension, of the forces acting on the vehicle body intersect the support surface at a point located between the vehicle wheels, irrespective of the speed of the vehicle, the camber of the curve and the radius thereof.

Figure 6:
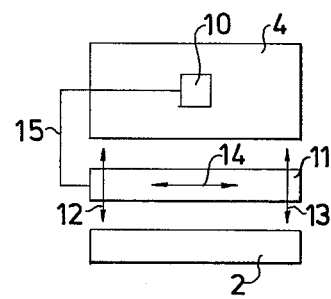
Figure 6A:
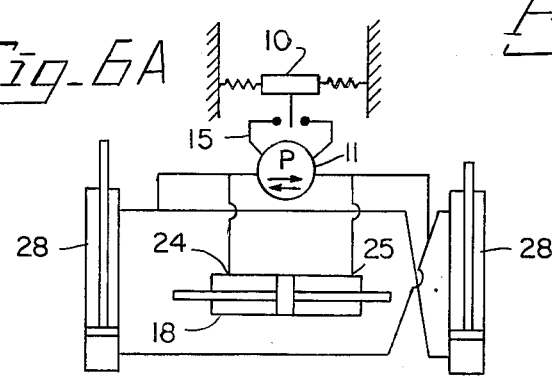
Figure 6B:
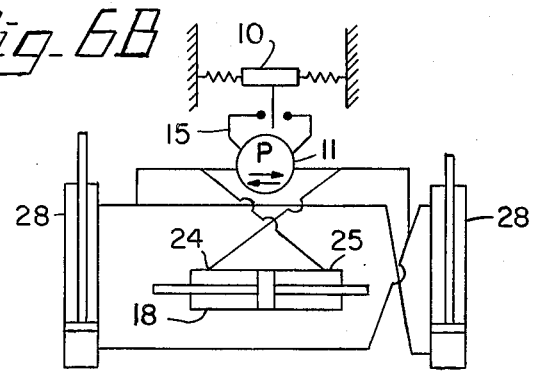
Figure 10:
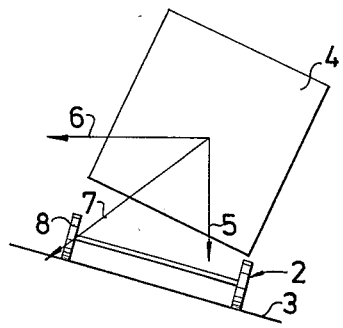
Figure 11:
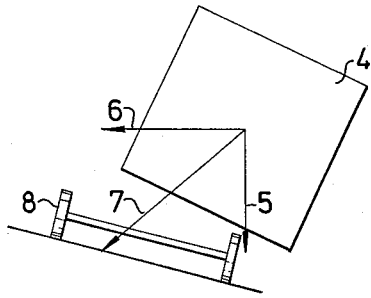
Figure 7:
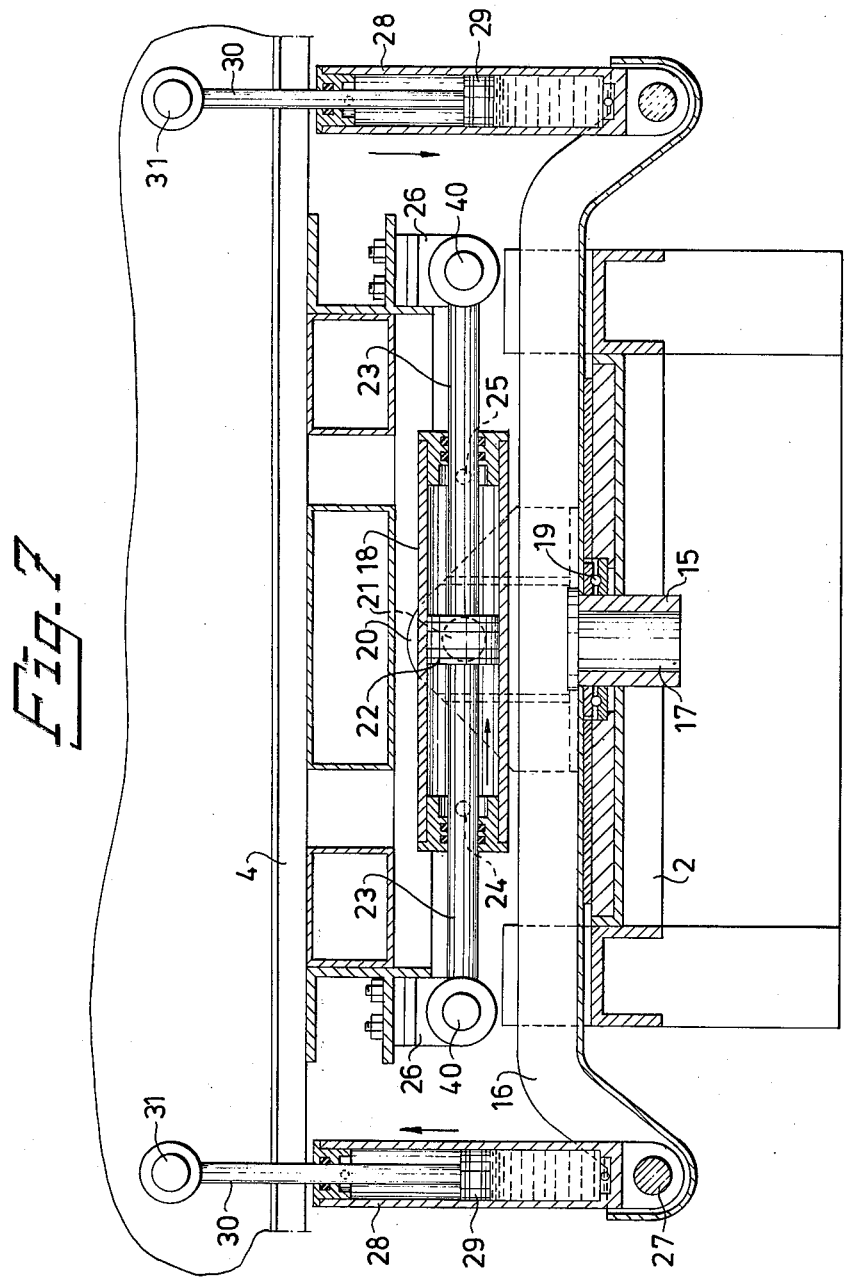

So that the invention will be more readily understood and further features thereof made apparent, a system according to the invention will now be described with reference to the accompanying drawings, in which FIG. 1 is a simplified view of a vehicle being driven along a straight movement path, FIG. 2 is a view of the vehicle travelling through a cambered curve, FIG. 3 illustrates the forces acting on the vehicle when the speed of said vehicle is greater than the maximum speed calculated for the curve camber, FIG. 4 illustrates the effect obtained by inclining the upper portion of the vehicle inwardly, FIG. 5 illustrates the invention, FIG. 6 illustrates simplified principles of an operating system, FIG. 6A is a schematic showing of one preferred form of operating system, FIG. 6B is a shematic showing of the preferred operating system arranged to produce lateral displacement in a reverse direction FIG. 7 is a partial cross-sectional view through an embodiment of a bogie arranged on one end of a railway carriage and shows the position including the neutral lateral orientation of the vehicle body when said carriage moves along a straight path in accordance with FIG. 1, FIG. 8 shows the same section with the carriage moving through a right-hand curve, FIG. 9 is a plan view of the system according to FIG. 7, and FIGS. 10 and 11 illustrate the invention with sole regard to the overturning risk.

Graphically illustrated in FIG. 1 is a railway carriage 1, as seen from one end thereof. The carriage 1 is supported on a bogie 2 having wheels which run on rails (not shown) of a track 3. The carriage also comprises an upper, a lower or a passenger carrying carriage or vehicle body 4 which is movably arranged on the bogie 2. When the carriage moves along a straight movement path, as is assumed in FIG. 1, the only force acting on the carriage body is that of gravity 5 and there is no risk of the carriage tilting. The gravitational force also acts on the passengers. The curve of a path along which a vehicle is intended to move, such as track 3, is normally cambered, as shown in FIG. 2, and the carriage body 4 will lean in towards the centre of the curve and, in addition to the force of gravity 5, will be acted upon by an outwardly directed centrifugal force 6. The resultant to the gravity force 5 and the centrifugal force 6 is identified by the reference 7. It is assumed in FIG. 2 that the carriage negotiates the curve at a speed which is determined by the camber and that the resultant 7 will thereby lie wholly between the wheels 8 and 9. Thus, there is no risk that the carriage will roll outwardly with the wheel 8 as the centre of rotation, and since the resultant 7 extends substantially or completely perpendicularly to the floor of the carriage, the passengers will not be concious of any outwardly acting force to the left as seen in FIG. 2.

It may be mentioned here that the majority of existing railways are dimensioned for a maximum speed of roughly 75 m/h (120 km/h) negotiating a curve, and that the camber of the curve is roughly 6°, as shown in FIG. 2. FIG. 3 illustrates the case when the speed of the carriage is substantially higher than the speed determined by the camber of the curve 3, and, as will be evident, the resultant force 7 of the centrifugal force 6 and the gravity force 5 will lie closer to the left wheel 8 and an outwardly directed rolling moment will occur, which can cause the carriage to overturn outwardly in the curve and to be de-railed. In this case, the passengers are subjected to a relatively high outwardly directed force and to considerable discomfort.

Attempts have been made to overcome the problems illustrated in FIG. 3 by, as shown in FIG. 4, swinging the whole of the vehicle body 4 in towards the centre of the curve around an upper or lower pivot point, thereby to cause the resultant force 7 to be moved inwardly by an extent such that the resultant 7 or its geometric extension lies centrally between the wheels 8 and 9. The risk of overturning or tipping can be completely eliminated by greatly inclining the vehicle body, for example through an angle of 18° relative to the horizontal plane with a camber of 6° and a calculated maximum speed of approximately 143 m/hr (230 km/h) in this instance the vehicle body will be located outside the so-called load profile of the movement path, i.e. the area around the track outside of which no objects is allowed to project. The load profile is shown with dash lines on FIG. 4. As will be seen from FIG. 4, with an inclination of 18° the direction in which the resultant force extends passes substantially at right angles to the floor of the vehicle body and the passengers are not therefore subjected to outwardly acting forces. Thus, to avoid discomfort to passengers in the case of a camber of 6° and a vehicle speed of 230 km/h, it is necessary with normal radii of curve curvature to incline the vehicle body 4 through an angle of approximately 18° relative to the horizontal plane, the resultant 7 passing at right angles or substantially at right angles to the floor of the vehicle body, i.e. by arranging that the passengers are subjected to a force according to FIG. 1. It is not permitted to lean the vehicle carriage to this extent, however, because of the aforementioned load profile.

In FIG. 5 there is illustrated a simplified system according to the invention, the FIGURE showing the same railway carriage as the remaining FIGURES. In FIG. 5, the carriage is assumed to be negotiating the same curve as that referred to with respect to FIGS. 3 and 4, at the assumed maximum speed, the resultant 7 extending substantially perpendicularly to the bottom of the vehicle body. As will be seen from FIG. 5, the exemplary angle of inclination of 18° relative to the horizontal plane can be permitted, whilst still retaining the carriage within the load profile, shown with dash lines, by laterally displacing the vehicle body outwardly from the centre of the curve, which is conceived to lie to the right of FIG. 5. The resultant will extend perpendicularly to the floor of the vehicle body between the wheels of the bogie, and the passengers will not therefore be subjected to uncomfortable forces, and neither will the carriage be in danger of overturning.

FIG. 6 illustrates in a very simplified manner a vehicle provided with a device for moving the vehicle body 4 relative to the vehicle chassis 2. The system of this embodiment is provided with a force detecting device 10, for example an accelerometer or a gyrodevice, which is arranged in a determined position on the carriage or vehicle body 4 and which is arranged to detect the centrifugal force 6 and the gravitational force 5 or the resultant force 7 and, in dependence of the result thereof, to produce output signals which are transmitted via conductors 15 to a control device 11. The control device 11 is arranged to effect the relative pivoting and displacement movement between the upper vehicle portion, or vehicle body 4, and the lower vehicle portion or chassis 2, and comprises means for causing movement between the said two vehicle portions in the direction of the arrows 12 and 13, respectively, thereby to cause tilting of the vehicle inwardly towards the curve, and to cause the vehicle body 4 to be displaced in the direction of the arrows 14.

The arrangement shown in FIG. 6, which is a servo-arrangement can be constructed in many different ways using known techniques, and will not be described in more detail.

A preferred embodiment of the invention is illustrated in FIGS. 7, 8 and 9, and is described with reference to a railway carriage. A bogie 2, which forms the lower vehicle portion shown in FIGS. 1–6, is provided in the centre of the substantially planar upper surface thereof with a vertical bearing sleeve 15. The bearing sleeve 15 is arranged to accomodate a bearing stud 17 arranged centrally on a transverse U-beam 16. The beam 16 is suitably provided on the planar undersurface thereof with a coating of material having a low coefficient of friction and is arranged to slide against a coating located on the upper surface of the bogie. To reduce the load on the coatings, an axial ball bearing 19 may be arranged adjacent the bearing sleeve. The transverse beam has on the upper surface thereof two centrally located, upwardly extending lugs 20. A hydraulic or pneumatic cylinder is provided with diametrically arranged bearing studs 21 which are mounted for rotation on the lugs 20, so that the cylinder 18 is pivotable in a vertical plane coinciding with the centre plane of the beam 16. A piston 22 is mounted in the cylinder 18 and is provided with piston rods 23 which project outwardly on both sides of the cylinder. The cylinder 18 is provided with connections 24 and 25 for a pressure medium source (not shown). The piston rods are of mutually equal length and the free ends thereof are pivotally mounted on posts 40 in the lugs 26 on the carriage body.

The illustrated, downwardly swung ends of the beam 16 are provided with transversally extending bearing studs 27 on two single-acting cylinders 28 each having a piston 29 which in turn has a piston rod 30. The end of each piston rod 30 is pivotally mounted on a bearing stud 31 on the carriage body 4.

In FIG. 6A there is depicted a suitable cylinder actuating system for the embodiment of FIG. 7. The accelerometer 10 controls a fluid pump 11, the latter supplying fluid to the ends of the cylinders 18 and 28, depending upon the direction of the forces being sensed by the accelerometer.

The aforedescribed preferred embodiment has the following mode of operation: When the carriage negotiates the curve, the force detecting device 10 shown in FIG. 6 will produce output signals which are sent to the device 11 and, depending on whether the curve is a right or left hand curve, will initiate a supply of pressure fluid to the single-acting cylinder 28, which is located on the outside of the curve and which simultaneously opens the connection between the opposed cylinder and a pressure fluid pump, to cause the carriage body 4 to be inclined or tilted toward the center of the curve, i.e., the outer body portion facing away from the center being elevated relative to the inner body portion facing the center, such that the resulting force passes completely or substantially completely at right angles to the floor of the carriage body. In FIG. 8, the angle at which the carriage is inclined relative to the horizontal plane is 18°. At the smae time, in dependence of the output signals from the detector 10, the supply of pressure medium to the double-acting cylinder 18 is controlled so that the carriage body 4 is moved outwardly of the centre of the curve and thus outwardly of its neutral lateral orientation to the position shown in FIG. 5 within the permitted load profile shown with dash lines.

The aforedescribed preferred embodiment comprises but one of many examples of how the invention can be realized. Thus, for example, the illustrated cylinders for inclining and laterally displacing the vehicle body may be replaced with any suitable form of operating device, for example jacks operated by electric motors, and, furthermore, the said lateral displacement may be effected, for example, by directly imparting to the two cylinders 29, by means of an operating means, a pivoting movement to provide the desired lateral displacement of the vehicle body.

This lateral displacement, the single purpose of which is to move the carriage body so that it lies within the determined load profile, i.e. the available free space on both sides of the railway line or carriage, amy also be determined by directly sensing the inclination of the upper vehicle portion 4. The output signals from the detector 10 may therefore also include signals which originate directly from an inclination detecting instrument.

FIGS. 10 and 11 illustrate in a simplified manner the case where only the risk of overturning is concerned and where sufficient space is found on both sides of the vehicle movement path to enable the vehicle body to be moved outside the confines of the sides of the chassis to a relatively large extent. The same references as those used in FIGS. 1–5 are used in FIGS. 10 and 11 and the centre of curvature of the curve lies to the right of the respective FIGURES. In this instance, the vehicle is assumed to be a lorry having a relatively low body 4 and carrying a heavy load. FIG. 10 illustrates the case where the speed of the lorry through a curve is too high, wherewith the aforementioned resultant force will lie adjacent to or outside the outer wheels 8. In this instance there is a risk that the lorry will overturn outwardly, despite the fact that the angle at which the vehicle body 4 is inclined to the chassis 2 is very large and cannot reasonably be increased. In accordance with the invention, the vehicle body 4 is moved in towards the centre of the curve by an amount such that the resultant 7 extends radially inwardly of the outer wheels 8 to an extent that the risk of overturning is eliminated. Since, in accordance with the invention, lateral displacement of the vehicle body is effected independently of the magnitude of said inclination, full safety can be obtained even with small angles of inclination. The operating devices employed to provide said inclining and central movements may be of any appropriate type and may, for example, comprise the previously described devices modified to provide displacement of the vehicle body in towards the centre of the curve.

For example, and as shown in FIG. 6B, the conduits extending from the pump to the cylinder 18 can be reversed from the arrangement shown in FIG. 6A to provide lateral movement away from the center of the curve.

I claim:

1. In a vehicle comprising a wheeled chassis arranged to ride upon a support surface, a body movably mounted on the chassis and being operable to carry passengers and goods, said vehicle body being normally situated in a neutral lateral orientation relative to said chassis during generally straight ahead travel of said vehicle, force detecting means for detecting and being activated by outwardly directed forces acting on the vehicle as the vehicle passes through a curve, and means operably connected to said force detecting means for displacing said body relative to said chassis in response to said vehicle passing through said curve, the improvement wherein said body displacing means comprises:

first power actuable means operably connected between said body and said chassis for tilting said body relative to said chassis such that the outer portion of said body facing away from the center of the curve is elevated relative to the inner portion of said body facing toward the center of the curve;

second power actuable means operably connected between said body and said chassis for laterally displacing said body relative to said chassis in a direction away from the center of the curve and away from said neutral lateral orientation;

power supply means for supplying power to actuate said first and second power actuable means comprising:

power source means;

first power transmitting means operably connecting said power source means to said first power actuable means to transmit power therebetween;

second power transmitting means operably connecting said power source means with said second power actuable means such that power is supplied to said second power actuable means separately from power supplied to said first power actuable means; and means interconnecting said power supply means and said force detecting means for actuating said first and second power actuable means in response to said vehicle passing through a curve.

2. A system according to claim 1 wherein said first power actuable means comprises at least a pair of fluid cylinders located on opposite sides of the longitudinal axis of said vehicle, said second power actuable means comprising at least one fluid cylinder which has a pivotal connection to said chassis for rotation about an axis disposed parallel to the longitudinal axis of said vehicle; said pivotal connection defining a pivot axis about which said body tilts relative to said chassis, so that said pivot connection remains fixed during tilting and lateral movement of the vehicle body.

3. In a vehicle comprising a wheeled chassis arranged to ride upon a support surface, a body movable mounted on the chassis and being operable to carry passengers and goods, said vehicle body being normally situated in a neutral lateral orientation relative to said chassis during generally straight ahead travel of said vehicle, force detecting means for detecting and being activated by outwardly directed forces acting on the vehicle as the vehicle passes through a curve, and means operably connected to said force detecting means for displacing said body relative to said chassis in response to said vehicle passing through said curve, the improvement wherein said body displacing means comprises:

first power actuable means operably connected between said body and said chassis for tilting said body relative to said chassis such that the outer portion of said body facing away from the center of the curve is elevated relative to the inner portion of said body facing toward the center of the curve;

second power actuable means operably connected between said body and said chassis for laterally displacing said body relative to said chassis in a direction toward the center of the curve and away from said neutral lateral orientation;

power supply means for supplying power to actuate said first and second power actuable means comprising:

power source means;

first power transmitting means operably connecting said power source means to said first power actuable means to transmit power therebetween;

second power transmitting means operably connecting said power source means with said second power actuable means such that power is supplied to said second power actuable means separately from power supplied to said first power actuable means; and means interconnecting said power supply means and said force detecting means for actuating said first and second power actuable means in response to said vehicle passing through a curve.

4. A system according to claim 3 wherein said first power actuable means comprises at least a pair of fluid cylinders located on opposite sides of the longitudinal axis of said vehicle; said second power actuable means comprising at least one fluid cylinder which has a pivotal connection to said chassis for rotation about an axis disposed parallel to the longitudinal axis of said vehicle; said pivotal connection defining a pivot axis about which said body tilts relative to said chassis, so that said pivot connection remains fixed during tilting and lateral movement of the vehicle body.

5. A system for reducing the risk of a vehicle overturning and for reducing the outward force on contents inside said vehicle when said vehicle is passing through a curve, said vehicle comprising:

a wheeled chassis arranged to co-act with and move on a supporting surface, a vehicle body pivotably mounted on said chassis and having a supporting surface for said contents, a force detecting device on said vehicle for detecting and being activated by outwardly directed forces acting on the vehicle as said vehicle passes through a curve, said chassis having a transverse beam which is rotatable about a vertical axis;

a pair of first piston-cylinders connected to said force detecting device and rotatably connected between respective ends of said beam and the vehicle body, said first piston-cylinders being arranged to tilt the vehicle body toward the center of the curve such that the outer portion of the vehicle body is elevated relative to the inner portion thereof; and a second piston-cylinder connected to said force detecting device and being journaled by longitudinal pivot means on said beam for rotation in a vertical plane, said second piston-cylinder being provided with two piston rods movable as one unit, said piston rods being directed toward the ends of said beam with their free ends being rotatably connected to said vehicle body, said second piston-cylinder being arranged to laterally displace said vehicle body relative to said chassis and relative to said longitudinal pivot means independently of the tilting forces exerted by said first piston-cylinders, in response to activation of said force detecting device.

6. Apparatus according to claim 5 wherein said second piston-cylinder is arranged to laterally displace said vehicle body toward the center of said curve.

7. Apparatus according to claim 5 wherein said second piston-cylinder is arranged to laterally displace said vehicle body away from the center of said curve.

* * * * *